United States Patent [19]

Fogt

[11] Patent Number: 4,757,897
[45] Date of Patent: Jul. 19, 1988

[54] DRINK BOTTLE CARTON HOLDER

[76] Inventor: Thomas H. Fogt, 510 Shade Dr., West Carrollton, Ohio 45449

[21] Appl. No.: 916,425

[22] Filed: Oct. 7, 1986

[51] Int. Cl.[4] .............................................. B65D 65/00
[52] U.S. Cl. ..................................... 206/427; 206/201; 206/203
[58] Field of Search ............... 206/427, 139, 201, 203; 220/18, 6

[56] References Cited

U.S. PATENT DOCUMENTS

| 138,534 | 5/1873 | Schlich et al. | |
|---|---|---|---|
| 1,169,471 | 1/1916 | Emanuel | 206/427 |
| 2,213,918 | 9/1940 | Lofstrand, Jr. | 206/427 |
| 2,502,910 | 4/1950 | Wilcox et al. | 220/18 |
| 2,583,389 | 1/1952 | Nickerson | 220/18 |
| 2,727,677 | 12/1955 | Zastrow | 229/52 |
| 2,774,468 | 12/1956 | Rous | 206/427 |
| 2,963,193 | 12/1960 | Arthur | 220/21 |
| 3,024,937 | 3/1962 | Kool | 220/18 |
| 3,084,667 | 4/1963 | Feli-bfgr et al. | 220/6 |
| 3,297,220 | 1/1967 | Leeberg | 224/45 |
| 3,473,654 | 10/1969 | Zimmerman | 206/427 |
| 3,490,583 | 1/1970 | Cook | 206/65 |
| 3,561,589 | 2/1971 | Larkin, Jr. et al. | 220/18 |
| 3,752,310 | 8/1973 | Higgin | 206/65 |
| 4,159,841 | 7/1979 | Calvert | 294/87.2 |
| 4,163,503 | 8/1979 | McKinnon | 220/18 |
| 4,189,056 | 2/1980 | Majewski | 211/195 |
| 4,226,348 | 10/1980 | Dottor et al. | 220/6 |
| 4,269,309 | 5/1981 | Prodel | 206/427 |
| 4,487,312 | 12/1984 | Heider | 206/158 |
| 4,519,538 | 5/1985 | Omichi | 229/27 |

Primary Examiner—Joseph Man-Fu Moy
Attorney, Agent, or Firm—Dybvig & Dybvig

[57] ABSTRACT

A bottle carton holder (10) includes a rectangular box assembly (12) having side and end walls (16a,b and 18a,b) and a bottom wall (20) to define a rectangular cavity (22). Divider members (28a,b) are positioned approximately midway between the end walls for dividing the cavity into approximately equal cavities, each of a size and shape for holding a carton of drink bottles with the long axes thereof extending from sidewall to sidewall. The divider members are located at the sidewalls and do not extend inwardly very far but do extend substantially higher than the sidewalls. Each of the end walls includes a stabilizing surface (38) for contacting a supporting surface (36) at a position located laterally further from the cavity (22) than any stabilizing surface on a sidewall. The bottle carton holder includes U-shaped hooks (14a,b) with laterally bent ends (46) extending about cartons located adjacent to the end walls and engaging the end walls for stabilizing the cartons.

7 Claims, 1 Drawing Sheet

DRINK BOTTLE CARTON HOLDER

BACKGROUND OF THE INVENTION

This invention relates generally to the art of bottle-carton holders and more particularly to a particular soft-drink carton holder for stabilizing cartons located on a moving support surface so as to prevent the cartons, and bottles contained therein, from tipping over or sliding.

Drink cartons, such as soft-drink cartons constructed of thin, flexible material (usually paper or the like), are notorious for tipping over or sliding when a support surface on which they are located moves. For example, if one places a carton full of soft drink bottles in the trunk of his car and drives to a grocery store the carton and the bottles contained therein, unless supported in some way, will most likely overturn. There exist boxes, such as wooden crates, for rigidly holding such cartons and preventing them from easily tipping over; however, these boxes are normally heavy, and bulky. In this respect, most such boxes are made to hold and retain four cartons, however, it often occurs that one need only carry one or two cartons. Thus, such a box uses an unduly large amount of space in a trunk in comparison with the number of cartons that are often carried therewith and often does not properly restrain fewer than four cartons. It is therefore an object of this invention to provide a bottle carton holder which is light in weight and which takes little more space than is required for accommodating exact numbers of cartons transported.

Yet another difficulty with prior art carton boxes is that they are often of a size, and/or are subdivided such that they can be used for little else than supporting bottle cartons. In this respect, it is an object of this invention to provide a bottle carton holder for a multiplicity of bottle cartons which also provides a holder for containing and stabilizing an upright bag of groceries as well as a holder for a casserole, a pie, books or other small objects.

It is yet another object of this invention to provide a bottle carton holder which, in addition to providing the above benefits, also is inexpensive and easy to manufacture but yet is durable and quite convenient to use.

SUMMARY

According to principles of this invention a bottle carton holder includes a box having two substantially-vertical sidewalls, two substantially-vertical end walls and a bottom wall for defining a rectangularly-shaped cavity which is open at the top. Divider members are positioned approximately midway between the end walls for dividing the cavity into two approximately equal subcavities, each of a size and shape for holding a carton of drink bottles with long axes thereof extending from box sidewall to sideall. The end walls include stabilizers having stabilizing surfaces positioned external thereof for contacting a supporting surface at a position located laterally outwardly further from the cavity than any stabilzing surface on the sidewalls. The divider members are each located at a sidewall and each extends inwardly only a small distance. Each dividing member extends a substantial distance above the sidewalls to help guide a carton into the box. Also, the dividing members allow a bag of groceries to be positioned therebetween and help stabilize at a greater height than the sidewalls this bag of groceries in an upright position. Also included as part of the bottle carton holder are U-shaped hooks having bent engaging ends. The U-shaped hooks are placed about cartons positioned outside and adjacent to the end walls of the box with their engaging bent ends hooked about the end walls so that they retain and stabilize these adjacently positioned cartons.

BRIEF DESCRIPTION OF THE DRAWINGS

The foregoing and other objects, features and advantages of the invention will be apparent from the following more particular description of the preferred embodiment of the invention, as illustrated in the accompanying drawings. The drawings are not necessarily to scale, emphasis instead being placed upon illustrating principles of the invention in a clear manner.

DETAILED DESCRIPTION OF THE DRAWINGS

A bottle carton holder 10 basically comprises a box assembly 12 and two identical U-shaped hooks 14a and b. In the depicted embodiment each of these three members is formed of a single, integral piece of hard plastic.

Figure 1:
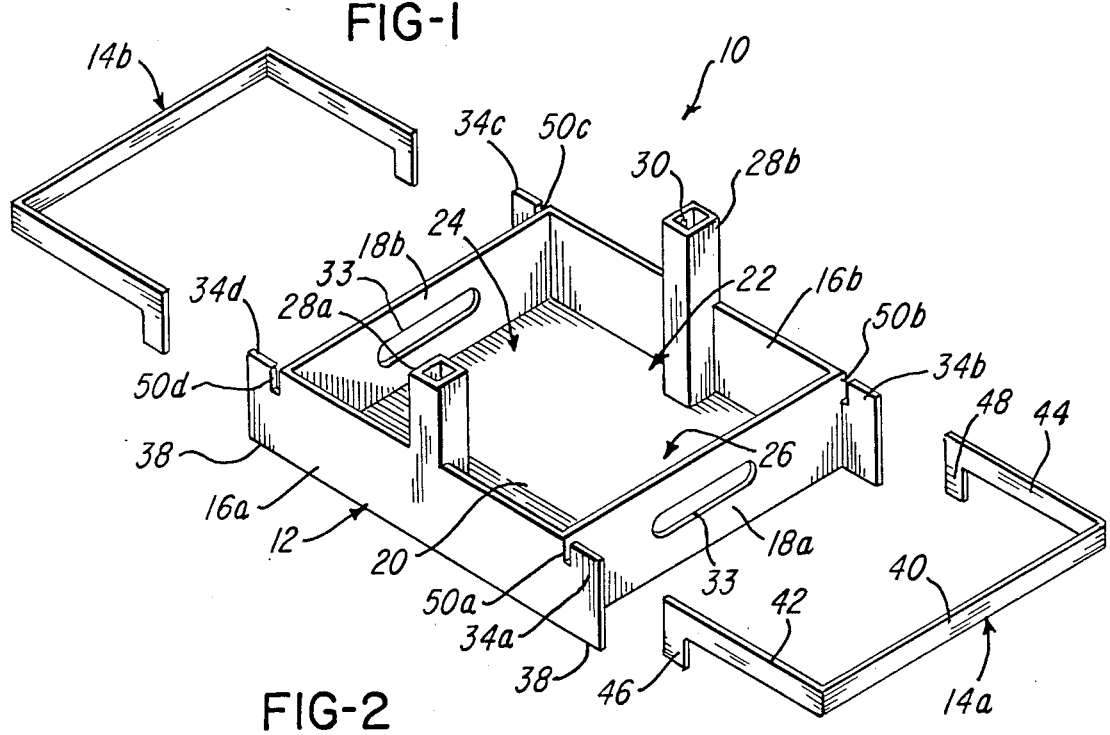
FIG. 1 is an isometric, exploded view of a bottle carton holder according to principles of this invention.

The box assembly 12 includes substantially vertical sidewalls 16a and 16b, substantially vertical end walls 18a and 18b and a bottom wall 20. As can be seen in FIG. 1, these walls are attached to one another (molded as one piece) to define a cavity 22 which is open at the top. The cavity 22 is further divided into essentially equal subcavities 24 and 26 by dividing members 28a and 28b. In this respect, the dividing member 28a is adjacent to, and integral with, sidewall 16a and the dividing member 28b similarly, is part of the sidewall 16b. Each of these dividing members 28a and 28b is positioned approximately midway beween the end walls 18a and 18b and each extends only a short distance inwardly, into the cavity 22. In order to keep wall thicknesses uniform, the dividing members 28a and 28b are molded to be hollow, each having a dividing-member cavity 30 therein. Each of the subcavities 24 and 26 is of such a size and shape that it will snugly receive and hold a thin, flexible drink carton, such as an eight or six bottle soft drink carton, with a longitudinal axis 32 (FIG. 3) of the soft drink carton extending from sidewall 16a to sidewall 16b and running parallel with end walls 18a and 18b. In this respect, the box assembly 12 is designed in such a manner that the length of a carton fitting in a subcavity 24 or 26 thereof will be substantially greater than the distance between dividing members 28a and 28b and therefore these dividing members will not allow cartons to move between them.

Each of the end walls 18a and 18b has a long slit 33 therein to be used as a handle when the holder 10 is used to carry a hot dish in the box assembly 12. However, normally the bottle carton holder 10 is left in a car so as to always be available for supporting items in the car.

In addition to what has already been described, in the depicted embodiment the box assembly 12 includes pairs of outrigger-type stabilizing members 34a, 34b, and 34c, 34d, each pair being attached to and extending laterally from a respective end wall 18b and 18a. In the depicted embodiment stabilizing members 34a and 34d are positioned at opposite ends of the sidewall 16a while stabilizing members 34b and 34c are positioned at opposite ends of the sidewall 16b. Each of these outrigger-type stabilizing members protrude outwardly from their respective end walls 18a and b so as to contact a supporting surface 36 (FIG. 2) with a stabilizing surface 38 at a location substantially removed from the cavity 22. That is, the stabilizing surface 38 contacts the supporting surface 36 at a laterally outward position which is located further from the cavity 22 than any stabilizing surface of the sidewalls 16a and 16b. These stabilizing members 34a–d and their supporting stabilizing surfaces 38 prevent the box assembly 12 from tipping over in the directions of their respective end walls when there is only one bottle carton located in the immediately adjacent subcavity 24 or 26.

The U-shaped hooks 14a and 14b each comprise a base strip 40, leg strips 42 and 44 attached to opposite ends of the base strip 40 and forming a U therewith, and bent engaging ends 46 and 48 at ends of the leg strips 42 and 44. Again, each of these U-shaped hooks 14a and 14b is constructed of one piece of hard plastic.

Figure 2:
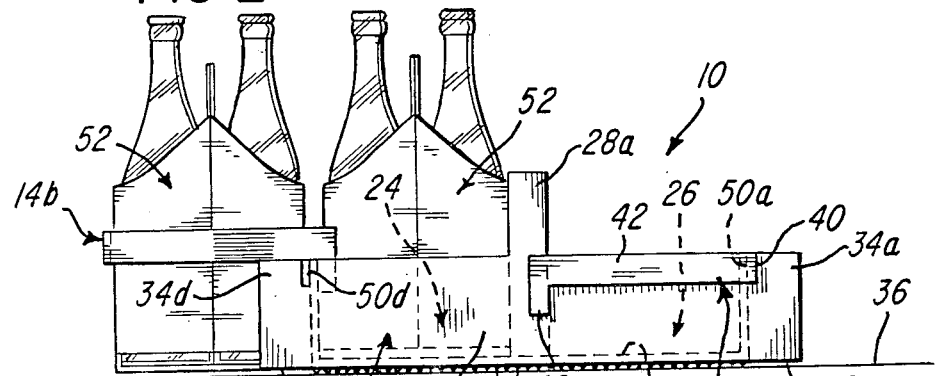
FIG. 2 is a side view of the bottle carton holder of FIG. 1 with one U-shaped hook being used to hold an adjacently-located bottle carton and another bottle carton being positioned in a subcavity thereof with an unused hook in a storage position; and, FIG. 3 is a top view of the arrangement of FIG. 2.

Each of the stabilizing members 34a–d has a notch 50a, 50b, 50c, or 50d in an upper edge thereof. Adjacent notches 50a and b and 50c and d are of a width and depth for receiving a base strip 40 of a U-shaped hook 14a or 14b for storage. As can be seen in FIG. 2, when a base strip 40 of a U-shaped hook 14a is placed in two notches with the legs 42 and 44 being directed toward the middle of the box assembly 12 the U-shaped hook will not disturb use of the subcavities 24 and 26.

The bottom wall 20 preferably has a textured or rough bottom surface 20A, as may be obtained by multiple small molded protrusions or the like, so that the box assembly 12 will resist sliding on a supporting surface. Alternatively, the bottom may be roughened by being perforated, also to hinder sliding.

Figure 3:
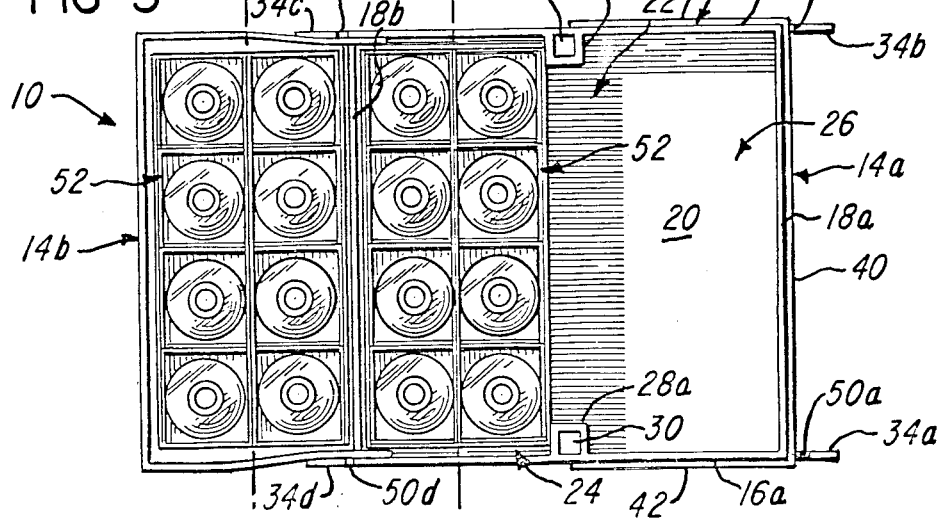

In use of the bottle carton holder 10 of this invention, the box assembly 12, with the U-shaped hooks 14a and 14b mounted in the notches 50a–d is placed on an unstable supporting surface, for example, on the floor of the trunk of a car. When it is desired to transport soft drink bottles in a paper-type, thin, flexible-material, carton with the car, the carton is placed in a subcavity 24 or 26 of the box assembly 12. If the carton is placed in subcavity 26 then stabilizing surfaces 38 of the stabilizing members 34a and 34b and the other side of the box assembly will prevent the box assembly from falling over toward either end. The widthwise centered carton and carton stiffness in this direction prevents widthwise tipping. If one desires to transport two soft drink cartons, he places a carton in each of the subcavities 24 and 26 and the weight of these two cartons, prevents capsizing of the cartons and the box assembly 12. Should a person desire to transport three or four cartons with the bottle carton holder 10, he places two of the cartons in the subcavities 24 and 26. The additional two cartons are each placed beside an end wall 18a and 18b between the respective stabilizing members 34a–b and 34c–d as is depicted in FIGS. 2 and 3. The user then removes the U-shaped hooks 14a and 14b from the notches 50a–d and engages the bent ends 46 with adjacent end walls 18a and 18b while looping the base strip 40 over the adjacent cartons, as is shown for one adjacent, thin, flexible-material, carton 52 in FIGS. 2 and 3. The stabilizing members also prevent sideways sliding and tipping of such external cartons. Should one desire to transport a bag of groceries with the bottle carton holder 10, he places the bottom of the bag of groceries in the cavity 22 with the dividing members 28 engaging opposite sides of the bag at positions higher than the sidewalls for helping to stabilize the bag sidewise. The bag is inherently stable end wise.

In the preferred embodiment, the box assembly is built of a size and shape for containing eight-bottle soft drink cartons. In this respect, the cavity 22 has a length (end wall 18a to end wall 18b) dimension of 11⅝ inches and a width (sidewall 16a to 16b) of 11⅛ inches. The dividing members 28a and 28b are each about 5 inches tall, ¾ inches wide (in the end wall to end wall direction) and about 1⅛ inches deep (sidewall to sidewall direction). The spacing between the dividing members is about 8⅞ inches. The sidewalls, end walls, and stabilizing members are all ⅛ inch thick while the U-shaped hooks 14a and 14b are 3/32 inch thick. End walls, sidewalls, and stabilizing members are 3⅝ inches high while the U-shaped hooks 14a and 14b are ½ inch wide. The leg strips 42 and 44 of the U-shaped hooks are normally spaced 11⅝ inches apart, however, when they are engaged with the box assembly 12 as depicted in FIGS. 2 and 3 the bent ends 46 and 48 are flexed inwardly toward one another on their respective legs.

It will be understood by those of ordinary skill in the art that the bottle·carton holder of this invention is relatively uncomplicated and inexpensive to manufacture but yet is extremely helpful and convenient for users who transport various numbers of bottle cartons with cars. The bottle carton holder occupies little space when not in use but yet it can be expanded to accommodate various numbers of bottle cartons. Further, the bottle carton holder of this invention can be used for stabilizing bags of groceries and the like when not in use as a bottle carton holder.

While the invention has been particularly shown and described with reference to a preferred embodiment, it will be understood by those skilled in the art that various changes in form and detail may be made therein without departing from the spirit and scope of the invention. For example, the U-shaped hooks 14a and 14b could be made of wire, or the like, rather than plastic. Further, eyelets could be located on the outer surfaces of the sidewalls 16a and 16b for receiving the bent engaging ends 46 and 48 of the U-shaped hooks 14a and 14b when they are stored in the notches 50a–d, as depicted in FIG. 2, to insure that these U-shaped hooks remain in their stored positions. Still further, rather than making outrigger (protruding) type stabilizing members 34a–d, as in the preferred embodiment disclosed herein, end walls 18a and 18b could be made to be much thicker than sidewalls 16a and 16b thereby still provide stabilizing surfaces which contact a supporting surface at a position located laterally further from the cavity than any stabilizing surface on the sidewalls. Still further, it is not necessary to make the box assembly 12 of one integral member of plastic but rather it could be made with assembled parts and of materials other than plastic.

The embodiments of the invention in which an exclusive property or privilege are claimed are defined as follows:

1. A bottle carton holder for holding various numbers of rectangularly-shaped, flexible, thin-walled bottle cartons on a supporting surface without allowing the cartons and/or bottles contained therein to tip over as said supporting surface is moved about, said bottle carton holder comprising:

a box having a vertical wall including two substantially-vertical sidewalls, two substantially-vertical end walls and a bottom wall, said side and end walls being attached to each other to define a rectangularly-shaped cavity and said bottom wall being attached to said side and end walls such that said cavity is open at the top, whereby said cartons can be placed into and removed from said box at the top thereof;

outrigger-type stabilizing members protruding outwardly from said end walls so as to provide a stabilizing surface for contacting said supporting surface at a point located outwardly from said end walls; and a separate molded, flat, U-shaped member having engaging means at the ends thereof for selectively engaging said vertical wall and extending about an extra carton of drink bottles position adjacent an end wall whereby the U-shaped member and the box stabilize the extra bottle carton, wherein said outrigger-type stabilizing member include notches therein in which said U-shaped members can be stored when not in use.

2. A bottle carton holder for holding various numbers of rectangularly-shaped, flexible, thin-walled bottle cartons on a supporting surface without allowing the cartons and/or bottles contained therein to tip over as said supporting surface is moved about, said bottle carton holder comprising:

a box having a vertical wall including two substantially-vertical sidewalls, two substantially-vertical end walls and a bottom wall, said side and end walls being attached to each other to define a rectangularly-shaped cavity and said bottom wall being attached to said side and end walls such that said cavity is open at the top, whereby said cartons can be placed into and removed from said box at the top thereof; and a U-shaped member having engaging means at the ends for engaging said vertical wall and looping about an extra bottle carton positioned adjacent to an end wall, whereby the U-shaped member and box stabilize the extra bottle carton.

3. A bottle carton holder as in claim 2, wherein said U-shaped member is a flat, molded piece of plastic.

4. A bottle carton holder for holding various numbers of bottle cartons on a supporting surface without allowing the cartons and/or bottles contained therein to tip over as said surface is moved about, said bottle carton holder comprising:

a box having a vertical wall including two substantially-vertical end walls and a bottom wall, said side and end walls being attached to each other to define a rectangularly-shaped cavity and said bottom wall being attached to said side and end walls such that said cavity is open at the top, whereby said cartons can be placed into and removed from said box at the top thereof; and a separate detachable U-shaped member having attaching means at ends thereof for selectively engaging said vertical wall, the U-shaped hook being sized to accomodate a bottle carton placed adjacent to an end wall;

whereby the U-shaped member and the box stabilize the thusly accomodated bottle carton placed adjacent to the end wall.

5. A bottle carton holder as in claim 4, wherein the box includes a U-shaped hook storage means for allowing the U-shaped hook to be located on the box when not in use without disturbing use of the cavity of the box for supporting a drink-bottle carton.

6. A bottle carton holder as in claim 4, wherein said box includes a divider means attached to the box midway between said end walls for dividing said cavity into two subcavities, each of a size and shape for holding a carton of drink bottles with long axes thereof extending from sidewall to sidewall.

7. A bottle carton holder as in claim 4, wherein a bottom surface of said bottom wall is rough for engaging said supporting surface and thereby resisting sliding of said bottle carton holder on said supporting surface.

* * * * *